United States Patent
Zhou et al.

(10) Patent No.: US 12,219,655 B2
(45) Date of Patent: Feb. 4, 2025

(54) TRANSMISSION METHOD AND APPARATUS OF DISCOVERY SIGNAL AND COMMUNICATION SYSTEM

(71) Applicant: FUJITSU LIMITED, Kawasaki (JP)

(72) Inventors: Hua Zhou, Beijing (CN); Lianhai Wu, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/714,596

(22) Filed: Sep. 25, 2017

(65) Prior Publication Data

US 2018/0014174 A1 Jan. 11, 2018

Related U.S. Application Data

(63) Continuation of application No. PCT/CN2015/076280, filed on Apr. 10, 2015.

(51) Int. Cl.
*H04W 8/00* (2009.01)
*H04W 48/16* (2009.01)
*H04W 72/04* (2023.01)

(52) U.S. Cl.
CPC ........... *H04W 8/005* (2013.01); *H04W 48/16* (2013.01); *H04W 72/04* (2013.01)

(58) Field of Classification Search
CPC ...... H04W 8/005; H04W 48/16; H04W 72/04
USPC ........................................................ 455/434
See application file for complete search history.

(56) References Cited

U.S. PATENT DOCUMENTS

| 2014/0112235 | A1 | 4/2014 | Jung et al. | |
|---|---|---|---|---|
| 2015/0009910 | A1* | 1/2015 | Ryu | H04W 72/04 370/329 |
| 2015/0045016 | A1* | 2/2015 | Xiong | H04W 4/80 455/552.1 |
| 2015/0271657 | A1* | 9/2015 | Xiong | H04W 8/005 370/329 |
| 2015/0319737 | A1* | 11/2015 | Cheng | H04W 72/04 370/329 |
| 2016/0057604 | A1 | 2/2016 | Luo et al. | |

(Continued)

FOREIGN PATENT DOCUMENTS

| CN | 103945497 A | 7/2014 |
|---|---|---|
| CN | 104113851 A | 10/2014 |

OTHER PUBLICATIONS

International Search Report issued for corresponding International Patent Application No. PCT/CN2015/076280, mailed on Jan. 15, 2016, with an English translation.

(Continued)

*Primary Examiner* — Chuck Huynh
(74) *Attorney, Agent, or Firm* — Myers Wolin, LLC

(57) ABSTRACT

A transmission method and apparatus of a discovery signal and a communication system. The transmission method of a discovery signal includes: determining one or more transmission resources from resource pools according to a sidelink discovery signal needing to be transmitted; and transmitting the sidelink discovery signal by using the one or more transmission resources; wherein the resource pools are segmented in a frequency domain and/or a time domain and hence comprise multiple types. Hence, cases of waste of resources or of impossible carrying may be reduced as much as possible even if sizes of discovery information are different due to different scenarios.

19 Claims, 13 Drawing Sheets

(56) References Cited

U.S. PATENT DOCUMENTS

2017/0012753 A1* 1/2017 Kim .................... H04W 56/002
2017/0353819 A1* 12/2017 Yin ......................... H04W 4/70

OTHER PUBLICATIONS

Written Opinion of the International Searching Authority issued for corresponding International Patent Application No. PCT/CN2015/076280, mailed on Jan. 15, 2016, with an English translation.
First Office Action and search report issued by the China National Intellectual Property Administration for corresponding Chinese Patent Application No. 201580077690.3, dated Oct. 24, 2019, with an English translation.
Second Notification of Office Action issued by the China National Intellectual Property Administration for corresponding Chinese patent application No. 201580077690.3, dated Jul. 15, 2020, with full English translation attached.

\* cited by examiner

TRANSMISSION METHOD AND APPARATUS OF DISCOVERY SIGNAL AND COMMUNICATION SYSTEM

CROSS REFERENCE TO RELATED APPLICATIONS

This application is a continuation application of International Application PCT/CN2015/076280 filed on Apr. 10, 2015, the entire contents of which are incorporated herein by reference.

TECHNICAL FIELD

This disclosure relates to the field of communication technologies, and in particular to a transmission method and apparatus of a sidelink discovery signal and a communication system.

BACKGROUND

In recent years, wireless communication technologies have developed rapidly, 3GPP standardization develops to Rel. 13, and key technologies cover wide configuration of small cells, carrier aggregation (CA), 3D multi-antenna technology (such as multiple input multiple output (MIMO)), and LTE (Long Term Evolution) enabling at an unlicensed band (such as licensed-assisted-access), etc.

Furthermore, as more and more attention is paid to public safety in some countries (such as the United States), and it is taken into account that wireless cellular networks based on the LTE technology have been widely used in the world, it is expected that support may be provided for the special service of public safety based on the wireless cellular networks. In detailed forms, the public safety service requires that a network is able to provide sidelink discovery and communication to some extent. The sidelink discovery and communication may also be referred to as device to device (D2D) discovery and communication.

A sidelink communication mode refers to that a data packet does not need to pass a core network and a base station, and a communication link may be directly established between user equipments (such as UE 1 and UE 2) for communication. And a sidelink discovery process is generally performed before sidelink communication is performed. For example, UE 1 needs first to discover whether UE 2 is near before transmitting information to UE 2 in the sidelink communication mode.

FIG. 1 is a schematic diagram of the sidelink communication under coverage of a cellular network. As shown in FIG. 1, what is discussed most in the study of the current 3GPP standardization is a case where two UEs are located within a coverage range of a base station (such as an eNB), in which connection between the two UEs may be established with assistance of the base station by using radio resources of the base station. It can be seen from FIG. 1 that one end transmits a discovery signal, and the other end receives the discovery signal, so as to achieve the target of discovering the other party, and data transmission therebetween may be performed after they discover each other.

In the existing standards, for the sidelink discovery shown in FIG. 1, a discovery message transmitted by the UE at one end is of a fixed size, which is 232 bits. Thus, the number of physical resource block (PRB) pairs occupied by corresponding physical sidelink discovery channels (PSDCHs) is also fixed, which is that two PRBs per slot, i.e. two PRB pairs per subframe.

A resource pool of PSDCHs is defined in the existing standards, which is a section of time-domain resources in LTE radio resources. FIG. 2 is a schematic diagram of allocation of an existing resource pool of PSDCHs. As shown in FIG. 2, resource blocks (RBs) in the grey area are in a resource pool for PSDCHs, and the area is notified to the user equipment via, for example, high layer signaling or media access control (MAC) layer signaling. In selecting a PSDCH for itself, each user equipment takes consecutively occupying two PRBs in the frequency domain and occupying two slots in the time domain as a selection unit, different user equipments may select PSDCH resources for themselves from the resource pool through contention.

As shown in FIG. 2, four PRBs in one shadowed area are occupied by one user equipment, and four PRBs in another shadowed area are occupied by another user equipment. And for further reduction in transmission collision, it is defined in the standards that at most four resource pools may be configured. However, in selecting PSDCH resources from any resource pool, the user equipment still transmits information in a manner that each slot occupies two PRBs.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that sizes of discovery information may be different due to different scenarios, which, for example, may be greater than 232 bits, or may be less than 232 bits. If new discovery information is less than 232 bits and two PRB pairs are still selected to carry the discovery information, waste of resources will be caused; and if new discovery information is greater than 232 bits, it is possible that two PRB pairs are unable to carry the discovery information.

Embodiments of this disclosure provide a transmission method and apparatus of a discovery signal and a communication system, in which cases of waste of resources or of impossible carrying may be reduced as much as possible even if sizes of discovery information are different due to different scenarios.

According to a first aspect of the embodiments of this disclosure, there is provided a transmission method of a discovery signal, applicable to a UE, the transmission method includes:

determining one or more transmission resources from resource pools according to a sidelink discovery signal needing to be transmitted; the resource pools are segmented in a frequency domain and/or a time domain and hence include multiple types; and transmitting the sidelink discovery signal by using the one or more transmission resources.

According to a second aspect of the embodiments of this disclosure, there is provided a transmission apparatus of a discovery signal, configured in a UE, the transmission apparatus includes:

a resource determining unit configured to determine one or more transmission resources from resource pools according to a sidelink discovery signal needing to be transmitted; the resource pools are segmented in a frequency domain and/or a time domain and hence include multiple types; and a signal transmitting unit configured to transmit the sidelink discovery signal by using the one or more transmission resources.

According to a third aspect of the embodiments of this disclosure, there is provided a transmission method of a discovery signal, applicable to a base station, the transmission method includes:

configuring resource pools; the resource pools are segmented in a frequency domain and/or a time domain and hence include multiple types; and transmitting information on the resource pools to a UE, so that the UE transmits a sidelink discovery signal by using one or more transmission resources determined from the resource pools.

According to a fourth aspect of the embodiments of this disclosure, there is provided a transmission apparatus of a discovery signal, configured in a base station, the transmission apparatus includes:

a resource pool configuring unit configured to configure one or more resource pools; the resource pools are segmented in a frequency domain and/or a time domain and hence include multiple types; and a resource transmitting unit configured to transmit information on the resource pools to a UE, so that the UE transmits a sidelink discovery signal by using one or more transmission resources determined from the resource pools.

According to a fifth aspect of the embodiments of this disclosure, there is provided a communication system, including:

a UE configured to determine one or more transmission resources from resource pools according to a sidelink discovery signal needing to be transmitted, and transmit the sidelink discovery signal by using the one or more transmission resources; the resource pools are segmented in a frequency domain and/or a time domain and hence include multiple types.

According to another aspect of the embodiments of this disclosure, there is provided a computer readable program code, which, when executed in a UE, will cause a computer unit to carry out the transmission method of a discovery signal as described above in the UE.

According to a further aspect of the embodiments of this disclosure, there is provided a computer readable medium, including a computer readable program code, which will cause a computer unit to carry out the transmission method of a discovery signal as described above in a UE.

According to still another aspect of the embodiments of this disclosure, there is provided a computer readable program code, which, when executed in a base station, will cause a computer unit to carry out the transmission method of a discovery signal as described above in the base station.

According to a further aspect of the embodiments of this disclosure, there is provided a computer readable medium, including a computer readable program code, which will cause a computer unit to carry out the transmission method of a discovery signal as described above in a base station.

An advantage of the embodiments of this disclosure exists in that the UE determines one or more transmission resources from resource pools segmented in a frequency domain and/or a time domain, and transmits the sidelink discovery signal by using the one or more transmission resources. Hence, cases of waste of resources or of impossible carrying may be reduced as much as possible even if sizes of discovery information are different due to different scenarios.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

With continuous progress of the standardization and development of public safety services, more and more application scenarios need sidelink services to be provided, especially need a sidelink discovery function between UEs, and a more flexible mechanism needs to be provided.

Figure 1:
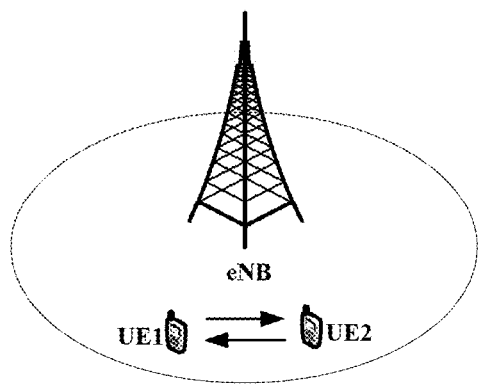
FIG. 1 is a schematic diagram of sidelink communication under coverage of a cellular network.
Figure 2:
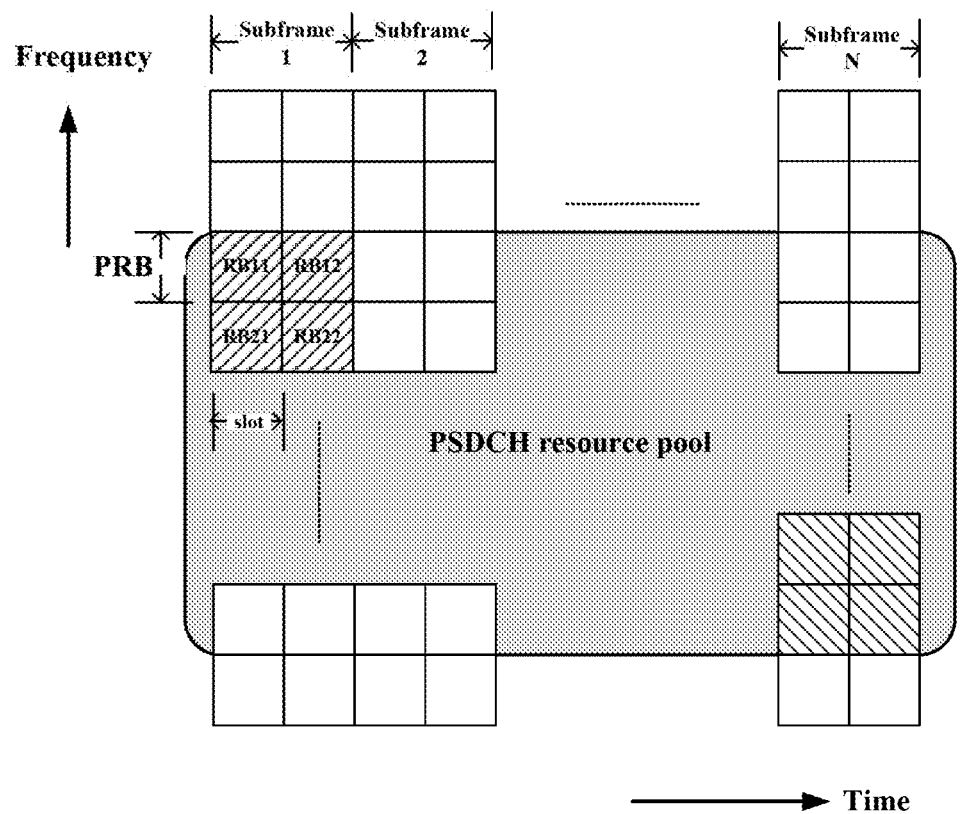
FIG. 2 is a schematic diagram of allocation of an existing resource pool of PSDCHs.
Figure 3:
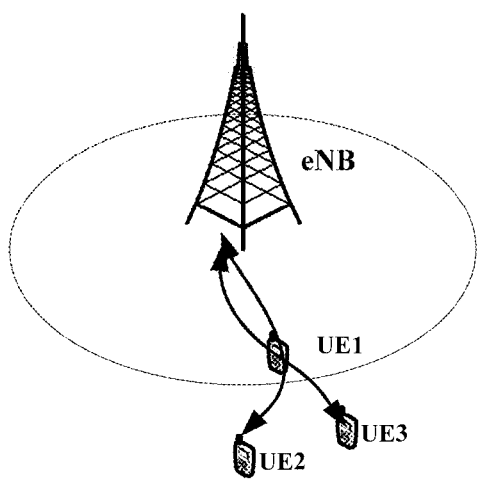
FIG. 3 is a schematic diagram of UE-to-network relay discovery of an embodiment of this disclosure.

For example, one case is that if a UE at one end of a sidelink is not under network coverage, it is expected that a UE at the other end under the network coverage can provide a relay function. FIG. 3 is a schematic diagram of UE-to-network relay discovery of an embodiment of this disclosure. As shown in FIG. 3, UE 1 is in a coverage range of a base station (such as an eNB), while UE 2 and UE 3 are out of the coverage range of the eNB. For these two UEs, if they expect to communicate with the eNB, UE 1 may be needed to relay. In order to achieve such a relay function, a function of relay connection establishment between UE 1 and UE 2/UE 3 is needed.

Figure 4:
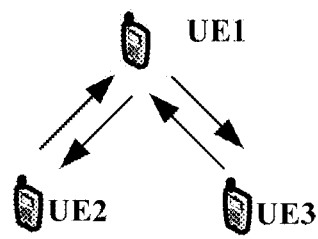
FIG. 4 is a schematic diagram of group member discovery of UEs of the embodiment of this disclosure.

For another example, another case is that if all UEs of a sidelink are not under network coverage, it is expected that connection is established between UE group members. FIG. 4 is a schematic diagram of group member discovery of UEs of the embodiment of this disclosure. As shown in FIG. 4, UE 1 is also out of the network coverage. If UE 1 expects to transmit messages (such as broadcast messages) to UEs around, as UE 2 and UE 3 are also out of the network coverage, a function of discovery between UE 1 and UE 2/UE 3 is needed.

Figure 5:
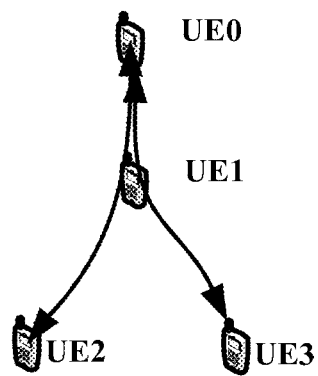
FIG. 5 is a schematic diagram of UE-to-UE relay discovery of the embodiment of this disclosure.

For a further example, a further case is that if all UEs of a sidelink are not under network coverage, it is expected that connection is established via relay of another UE. FIG. 5 is a schematic diagram of UE-to-UE relay discovery of the embodiment of this disclosure. As shown in FIG. 5, if UE 2 and UE 3 expect to establish connection with UE 0 via UE 1, a function of discovery between UE 0, UE 1 and UE 2/UE 3 is needed, and a requirement on the function of discovery is different from requirements on the previous two functions of discovery.

If a demand of function expansion of a sidelink is taken into account, transmission of at least three types of discovery messages need to be provided, which respectively correspond to the UE-to-network relay discovery shown in FIG. 3, the group member discovery shown in FIG. 4 and the UE-to-UE relay discovery shown in FIG. 5. And a length of each type of discovery messages is no longer 232 bits as defined in original standards. That is, sizes of current discovery information may be different due to different scenarios.

Hence, if a length of any one of the three types of new discovery messages exceeds 232 bits, information needs to be compressed so as to be placed into an original PSDCH designed for 232 bits. If the length is too long, a problem may still occur that the information cannot be placed into the PSDCH even if it is compressed. Furthermore, if a length of a new discovery message is less than 232 bits, and it is placed into the original PSDCH, a problem of waste of radio resources will be caused.

Therefore, in order to be adapted for a new sidelink discovery message, a PSDCH needs to be enhanced or a new PSDCH resource pool needs to be used. The embodiments of this disclosure shall be described below in detail.

Embodiment 1

Figure 6:
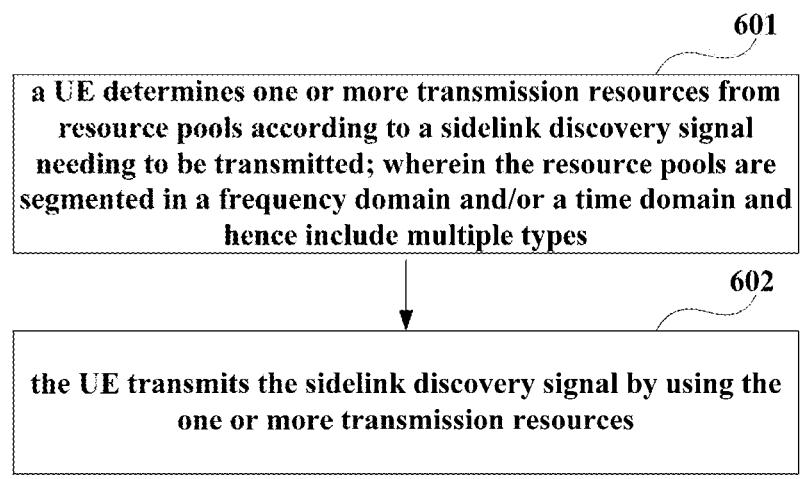
FIG. 6 is a flowchart of the transmission method of a discovery signal of Embodiment 1 of this disclosure.

The embodiment of this disclosure provides a transmission method of a discovery signal, applicable to a UE. FIG. 6 is a flowchart of the transmission method of a discovery signal of the embodiment of this disclosure. As shown in FIG. 6, the transmission method includes:

block 601: a UE determines one or more transmission resources from resource pools according to a sidelink discovery signal needing to be transmitted; the resource pools are segmented in a frequency domain and/or a time domain and hence include multiple types; and block 602: the UE transmits the sidelink discovery signal by using the one or more transmission resources.

In this embodiment, the resource pools are segmented in a frequency domain and/or a time domain and hence include multiple types, and in different types of resource pools, the numbers of PRBs for transmitting the sidelink discovery signal may be different. For example, the discovery signal may be carried by one PRB in some resource pools, alternatively, the discovery signal may be carried by two PRBs in some resource pools, and alternatively, the discovery signal may be carried by three PRBs in some resource pools, and so on.

For example, the resource pools may be configured by a base station and then transmitted to the UE. And the UE may determine the one or more transmission resources from the resource pools according to a size of the sidelink discovery signal when the UE is in a connected state and needs to perform sidelink discovery, so as to perform a sidelink discovery process, in which case the UE may be, for example, UE 1 in the scenario shown in FIG. 3.

Furthermore, the UE may store information on the resource pools, and may determine the one or more transmission resources from the resource pools according to a size of the sidelink discovery signal when the UE is in an idle state and needs to perform sidelink discovery, so as to perform a sidelink discovery process, in which case the UE may be, for example, UE 1 in the scenario shown in FIG. 4 or 5.

Hence, the UE may flexibly select resources suitable for sidelink discovery from the resource pools of different types, and cases of waste of resources or of impossible carrying may be reduced as much as possible even if sizes of the discovery information are different due to different scenarios.

In an implementation, the resource pools may be segmented in the frequency domain into multiple types. That is, the base station configures multiple sets of transmission channel radio resource pools for transmitting discovery messages, each set corresponding to one type of message transmission format, and the multiple sets of resource pools may be spaced apart as per frequency domain.

Figure 7:
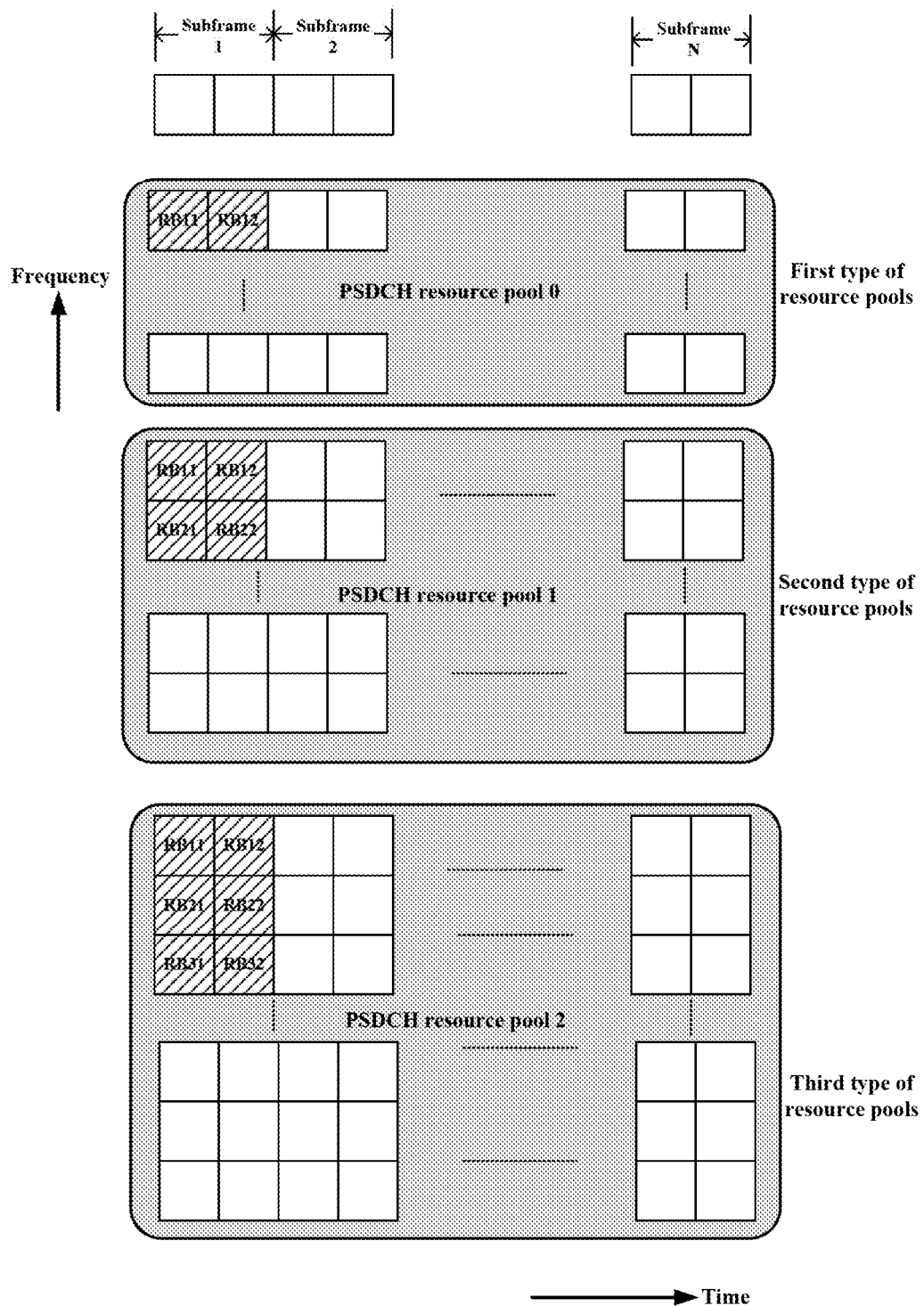
FIG. 7 is a schematic diagram of multiple types of resource pools segmented in a frequency domain of Embodiment 1 of this disclosure.

FIG. 7 is a schematic diagram of multiple types of resource pools segmented in the frequency domain of the embodiment of this disclosure. As shown in FIG. 7, in a first type of resource pools, a discovery channel may be transmitted in one PRB at each slot, that is, one PRB pair for each subframe, corresponding to transmission of a discovery message of a relatively small length; in a second type of resource pools, a discovery channel may be transmitted in two PRBs at each slot, that is, two PRB pairs for each subframe, used for transmitting a discovery message of a medium length; and in a third type of resource pools, a discovery channel may be transmitted in three PRBs at each slot, that is, three PRB pairs for each subframe.

In this implementation, viewing from the frequency domain, the PRBs in each set of resource pools may not be always consecutive. That is, in each type of resource pools, the PRBs used for transmitting the sidelink discovery signal may not be all consecutive in the frequency domain.

Figure 8:
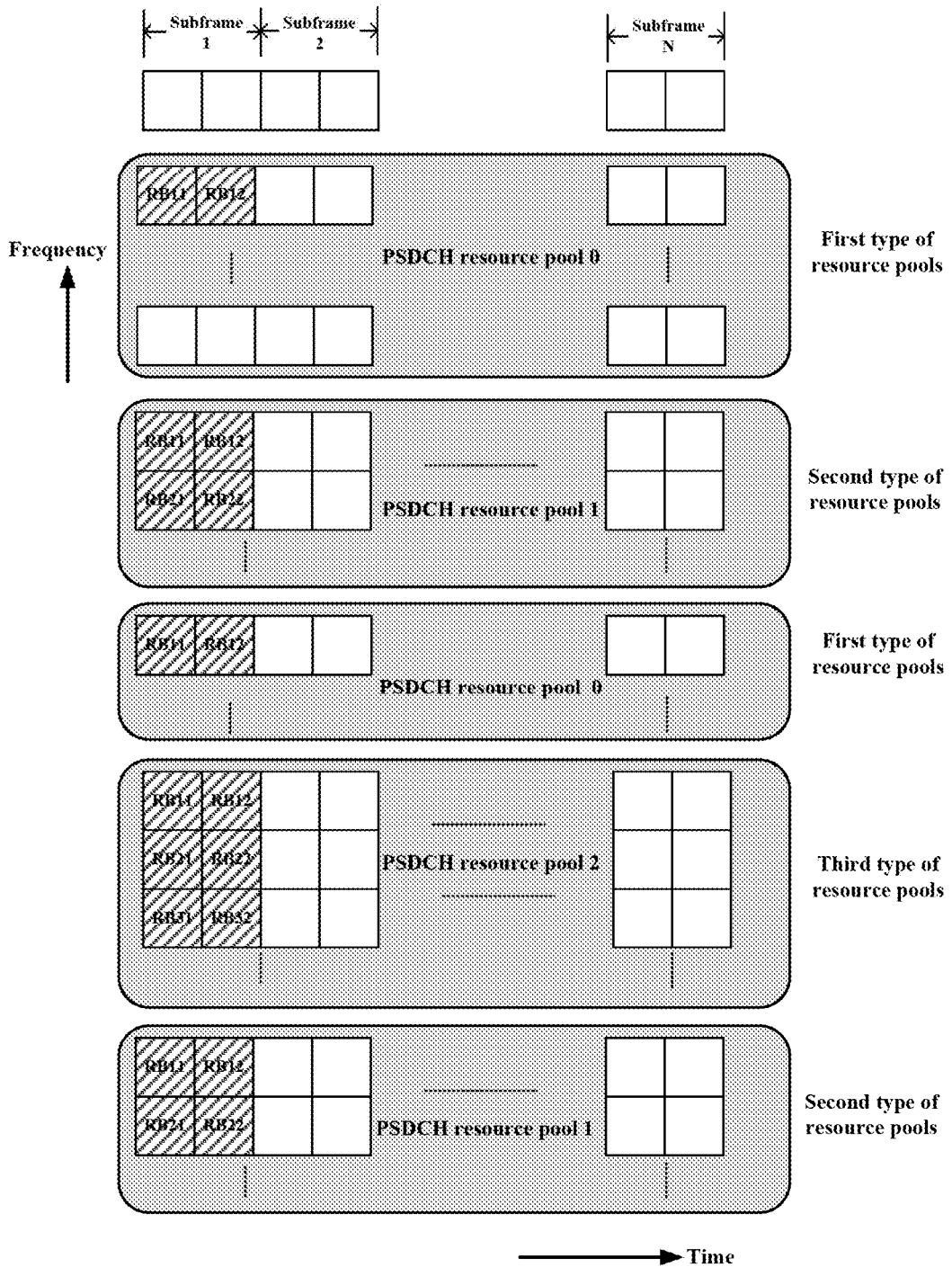
FIG. 8 is another schematic diagram of the multiple types of resource pools segmented in a frequency domain of Embodiment 1 of this disclosure.

FIG. 8 is another schematic diagram of the embodiment of this disclosure, in which the multiple types of resource pools segmented in the frequency domain are shown, each type of resource pools containing resource pools located at different positions in the frequency domain. As shown in FIG. 8, the base station allocates two resource pools of a first type at different positions, two resource pools of a second type at different positions, and one resource pool of a third type. And the base station may allocate multiple resource pools of the same type or multiple resource pools of different types for the UE as demanded.

In another implementation, the resource pools may be segmented in the time domain into multiple types, that is, the base station may configure multiple sets of resource pools which are spaced apart as per time domain. For example, in a set of subframes, the set of subframes may be consecutive subframes, or may be spaced subframes, and resources in the set of subframes are allocated according to a fixed number of PRBs; and in another set of subframes, the number of PRBs occupied by the discovery channel in the resource pools is different from that in the first type of resource pools.

Figure 9:
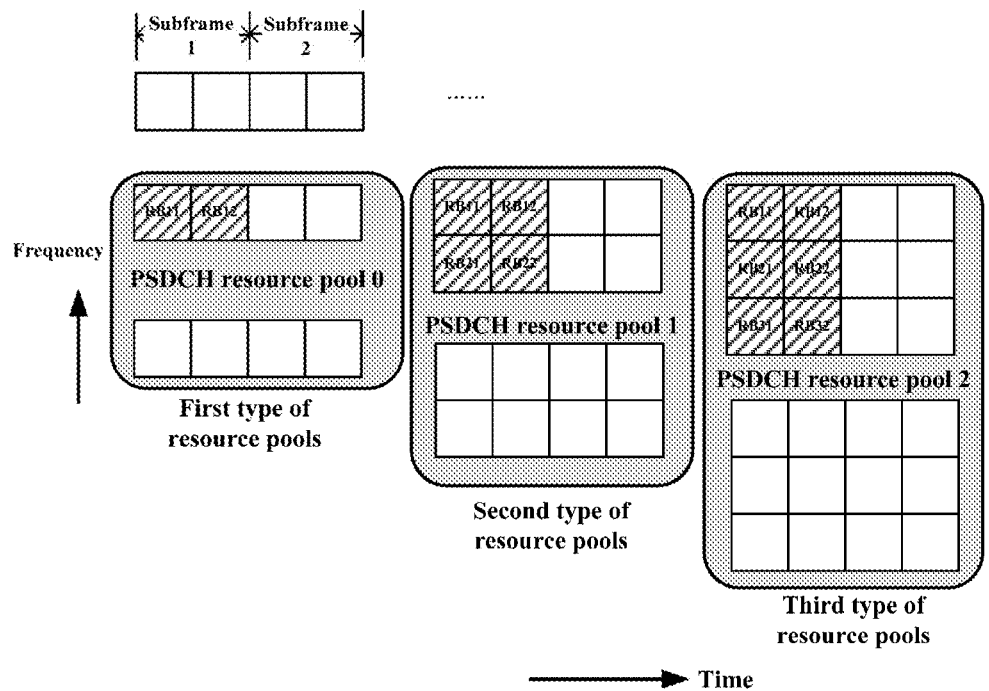
FIG. 9 is a schematic diagram of multiple types of resource pools segmented in a time domain of Embodiment 1 of this disclosure.

FIG. 9 is a schematic diagram of multiple types of resource pools segmented in the time domain of the embodiment of this disclosure. As shown in FIG. 9, there exist only the first type of resource pools in a first and second subframes, and if the UE transmits the discovery signal by using radio resources in the first type of resource pools, it selects one PRB pair only; there exist only the second type of resource pools in a third and fourth subframes, and the UE selects two PRB pairs; and there exist only the third type of resource pools in a fifth and sixth subframes, and the UE selects three PRB pairs.

In this implementation, in each type of resource pools, the PRBs used for transmitting the sidelink discovery signal may also not be all consecutive in the time domain.

Figure 10:
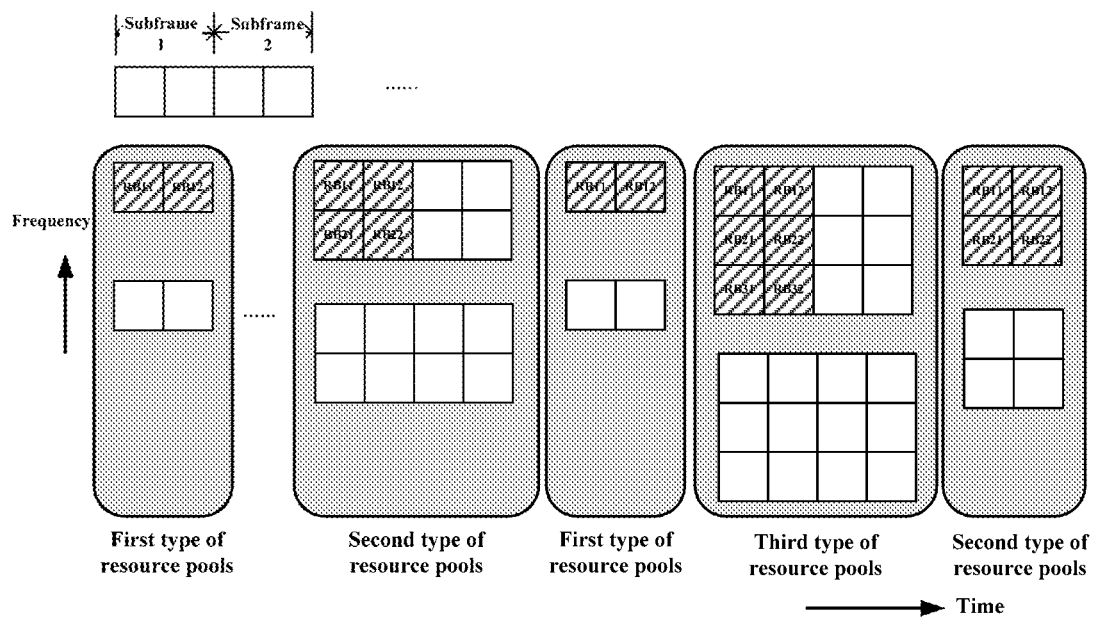
FIG. 10 is another schematic diagram of the multiple types of resource pools segmented in a time domain of Embodiment 1 of this disclosure.

FIG. 10 is another schematic diagram of the embodiment of this disclosure, in which the multiple types of resource pools segmented in the time domain are shown, each type of resource pools containing multiple resource pools located at different positions in the time domain. As shown in FIG. 10, the base station allocates two resource pools of the first type at different time domain positions, two resource pools of the second type at different time domain positions and one resource pools of the third type. And the base station may allocate multiple resource pools of the same type or multiple resource pools of different types for the UE as demanded.

In another implementation, the segmentation in the frequency domain and the segmentation in the time domain may be combined, thereby flexibly allocating the sets of resource pools in a two-dimensional space in the frequency domain and in the time domain.

Segmentation of the resource pools is described above, and how to transmit the information on the resource pools by the base station shall be described below.

In an implementation, the base station may transmit the information on the multiple types of resource pools to the UE, and the UE may determine a type of resource pools to use and particular resources on its own.

Figure 11:
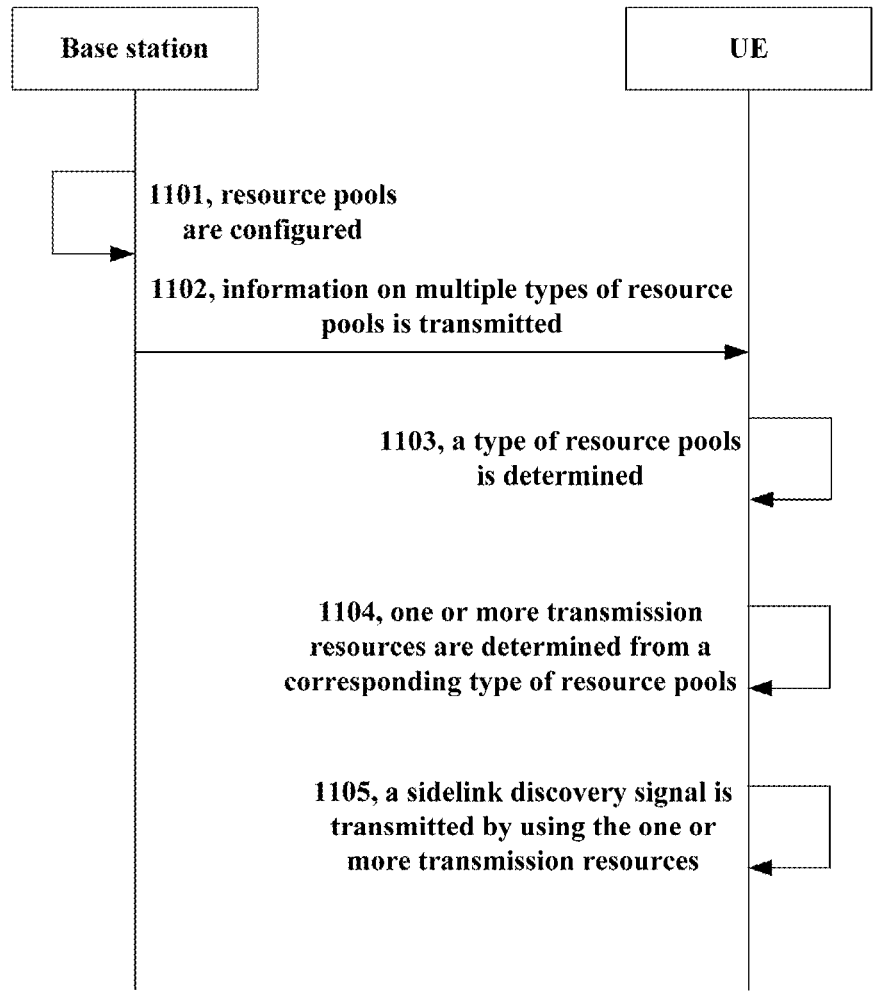
FIG. 11 is another flowchart of the transmission method of a discovery signal of Embodiment 1 of this disclosure.

FIG. 11 is another flowchart of the transmission method of a discovery signal of the embodiment of this disclosure. As shown in FIG. 11, the transmission method includes:

1101: the base station configures resource pools used for sidelink discovery;

1102: the base station transmits information on multiple types of resource pools to the UE;

for example, the base station may allocate multiple types of resource pools according to one or more rules (such as the number of UEs needing to transmit discovery signals, and a situation of use of radio resources, etc.), each type of resource pools containing one or more resource pools, multiple resource pools pertaining to the same type of resource pools having identical resource allocation granularities;

the base station may transmit the information on multiple types of resource pools to the UE via broadcast signaling, the information on the resource pools may include positions and sizes of time frequency resources occupied by the resource pools, and the types of the resource pools or a method of selection of resources (such as selecting resources as per one PRB, or two PRBs, or three PRBs, and so on), etc.

1103: the UE determines a corresponding type of resource pools according to a sidelink discovery signal needing to be transmitted;

for example, which type of resource pools will be used may be determined according to a size of the sidelink discovery signal; for example, if the size of the sidelink discovery signal is relatively small, the first type of resource pools (one PRB pair in each subframe is used for transmitting sidelink discovery signals) may be selected; if the size of the sidelink discovery signal is medium, the second type of resource pools (two PRB pairs in each subframe are used for transmitting sidelink discovery signals) may be selected; and if the size of the sidelink discovery signal is relatively large, the third type of resource pools (three PRB pairs in each subframe are used for transmitting sidelink discovery signals) may be selected, and so on;

1104: the UE selects one or more transmission resources from a corresponding type of resource pools;

for example, if the first type of resource pools are selected in 1103, particular transmission resources may be selected from, for example, four resource pools in the first type of resource pools;

1105: the UE transmits the sidelink discovery signal by using the one or more transmission resources.

In another implementation, the UE may transmit information on the sidelink discovery signal (auxiliary information) to the base station in advance, the base station determines a type of resource pools according to the information and transmit information on the determined type of resource pools to the UE, and the UE determines particular resources from the resource pools on its own.

Figure 12:
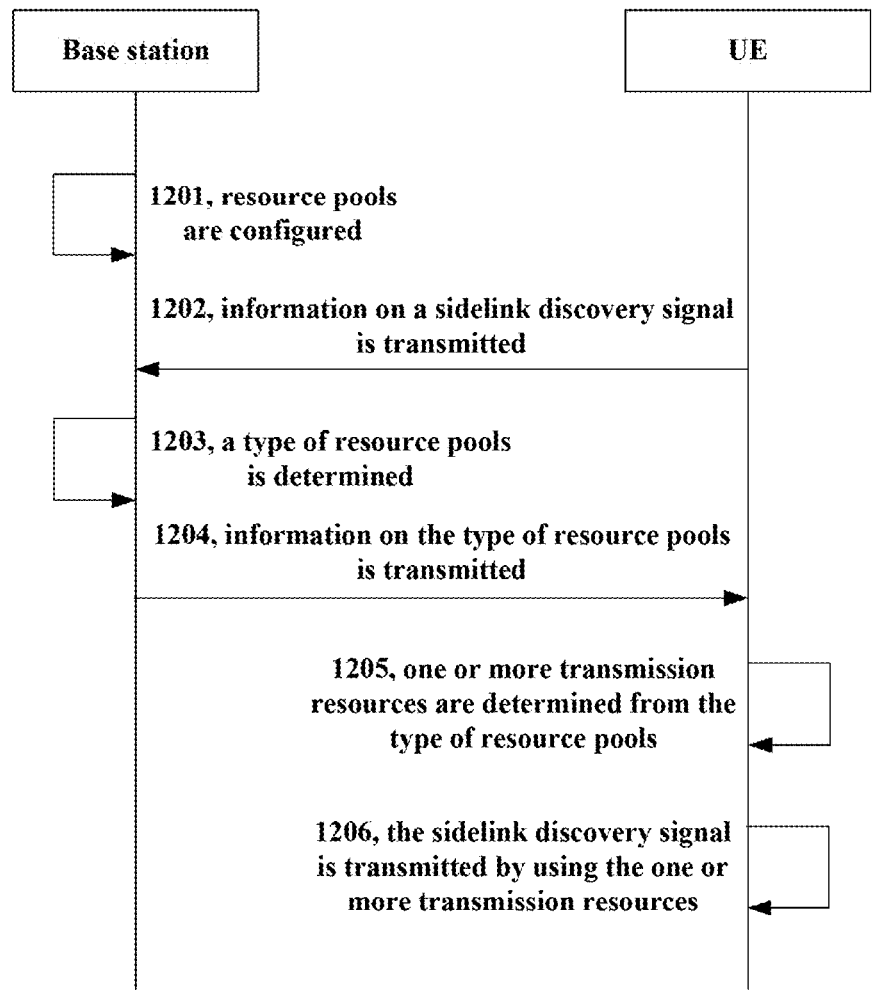
FIG. 12 is a further flowchart of the transmission method of a discovery signal of Embodiment 1 of this disclosure.

FIG. 12 is a further flowchart of the transmission method of a discovery signal of the embodiment of this disclosure. As shown in FIG. 12, the transmission method includes:

1201: the base station configures resource pools used for sidelink discovery;

for example, the base station may allocate multiple types of resource pools according to one or more rules (such as the number of UEs needing to transmit discovery signals, and a situation of use of radio resources, etc.), each type of resource pools containing one or more resource pools, multiple resource pools pertaining to the same type of resource pools having identical resource allocation granularities;

1202: the UE transmits information on a sidelink discovery signal;

for example, the UE may transmit auxiliary information to the base station in advance, the auxiliary information may include information on a type of the sidelink discovery signals, such as information on a length of the sidelink discovery signal at least, or a type and the number of sidelink discovery signals at least;

1203: the base station determines a type of resource pools according to the information on the sidelink discovery signal;

1204: the base station transmits information on the determined type of resource pools to the UE;

for example, the base station may determine a type of resource pools used by the UE according to received information on the sidelink discovery signal, and then notify information on one or more resource pools of the type to the UE via specific signaling, the information on the resource pool may contain a size of position of the resource pool, and a rule for using resources in the resource pool (such as occupying resources according to the number of PRBs or PRB pairs), etc.;

1205: the UE selects one or more transmission resources from the type of resource pools; and 1206: the UE transmits the sidelink discovery signal by using the one or more transmission resources.

It should be noted that configuring the resource pools in 1201 may be performed after 1202, resource pools suitable for the type of discovery signals may be configured after obtaining the information on the sidelink discovery signal, and the information on the resource pools is transmitted in 1204.

In this embodiment, multiple types of resource pools are configured, using methods of radio resources and granularities in each type of resource pools being different, so as to adapt to transmission of different sidelink discovery signals. Furthermore, the base station determines whether broadcast signaling is used to transmit multiple types of resource pools or specific signaling is used to notify a single type of resource pools according to whether a type of discovery messages, or the like, of the UE may be obtained. And transmission of discovery messages of multiple sidelink applications may be flexibly adapted to by designing multiple types of resource pools.

It can be seen from the above embodiment that the UE determines one or more transmission resources from resource pools segmented in a frequency domain and/or a time domain, and transmits a sidelink discovery signal by using the one or more transmission resources. Hence, cases of waste of resources or of impossible carrying may be reduced as much as possible even if sizes of discovery information are different due to different scenarios.

Embodiment 2

The embodiment of this disclosure provides a transmission method of a discovery signal, applicable to a base station, with contents identical to those in Embodiment 1 being not going to be described herein any further.

Figure 13:
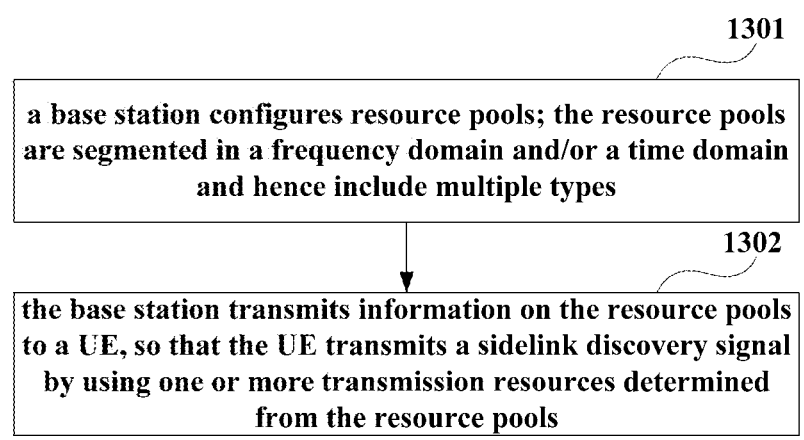
FIG. 13 is a flowchart of the transmission method of a discovery signal of Embodiment 2 of this disclosure.

FIG. 13 is a flowchart of the transmission method of a discovery signal of the embodiment of this disclosure. As shown in FIG. 13, the transmission method includes:

block 1301: the base station configures resource pools; the resource pools are segmented in a frequency domain and/or a time domain and hence include multiple types; and block 1302: the base station transmits information on the resource pools to UE, so that the UE transmits a sidelink discovery signal by using one or more transmission resources determined from the resource pools.

In an implementation, the resource pools are segmented in a frequency domain into multiple types, and in different types of resource pools, the numbers of PRBs for transmitting sidelink discovery signals are different. In each type of resource pools, the PRBs used for transmitting the sidelink discovery signal may not be all consecutive in the frequency domain.

In another implementation, the resource pools are segmented in a time domain into multiple types, and in different types of resource pools, the numbers of PRBs for transmitting sidelink discovery signals are different. In each type of resource pools, the PRBs used for transmitting the sidelink discovery signal may not be all consecutive in the time domain.

In an implementation, the base station may transmit information on the multiple types of resource pools to the UE, and the UE may determine a type of resource pools to use and particular resources on its own. The base station may transmit the information on the multiple types of resource pools by using a broadcast message, and resource pools of the same type may include one or more resource pools.

In another implementation, the UE may transmit information on the sidelink discovery signal (such as a size of the discovery signal, or a type and the number of pieces of discovery information) to the base station in advance, the base station determines a type of resource pools according to the information and transmit information on the determined type of resource pools to the UE, and the UE determines particular resources from the resource pools on its own. The base station may use specific signaling to transmit information on a type of resource pools, and the type of resource pools may include one or more resource pools.

It can be seen from the above embodiment that the UE determines one or more transmission resources from resource pools segmented in a frequency domain and/or a time domain, and transmits a sidelink discovery signal by using the one or more transmission resources. Hence, cases of waste of resources or of impossible carrying may be reduced as much as possible even if sizes of discovery information are different due to different scenarios.

Embodiment 3

The embodiment of this disclosure provides a transmission apparatus of a discovery signal, configured in a UE. The embodiment of this disclosure corresponds to the transmission method in Embodiment 1, with identical contents being not going to be described herein any further.

Figure 14:
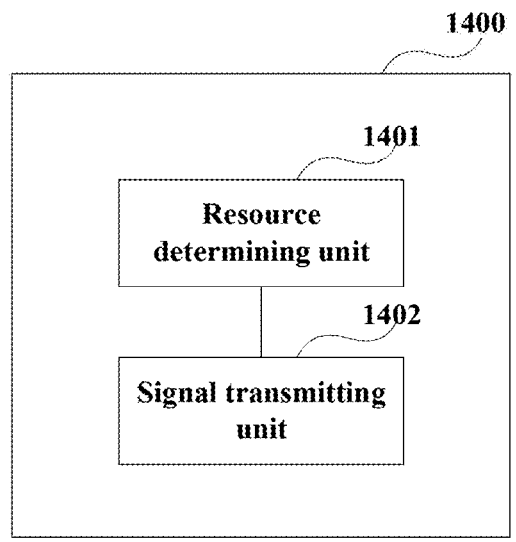
FIG. 14 is a schematic diagram of the transmission apparatus of a discovery signal of Embodiment 3 of this disclosure.

FIG. 14 is a schematic diagram of the transmission apparatus of a discovery signal of the embodiment of this disclosure. As shown in FIG. 14, the transmission apparatus 1400 includes:

a resource determining unit 1401 configured to determine one or more transmission resources from resource pools according to a sidelink discovery signal needing to be transmitted; the resource pools are segmented in a frequency domain and/or a time domain and hence include multiple types; and a signal transmitting unit 1402 configured to transmit the sidelink discovery signal by using the one or more transmission resources.

In an implementation, the resource pools are segmented into multiple types in the frequency domain, and in the different types of resource pools, the numbers of PRBs for transmitting sidelink discovery signals are different. In each type of resource pools, the PRBs for transmitting the sidelink discovery signal are not all consecutive in the frequency domain.

In an implementation, the resource pools are segmented into multiple types in the time domain, and in the different types of resource pools, the numbers of PRBs for transmitting sidelink discovery signals are different. In each type of resource pools, the PRBs for transmitting the sidelink discovery signal are not all consecutive in the time domain.

Figure 15:
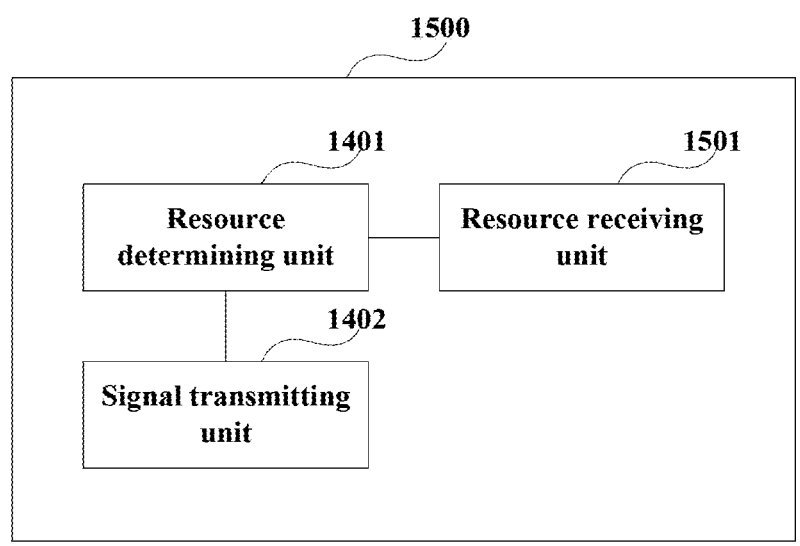
FIG. 15 is another schematic diagram of the transmission apparatus of a discovery signal of Embodiment 3 of this disclosure.

FIG. 15 is another schematic diagram of the transmission apparatus of a discovery signal of the embodiment of this disclosure. As shown in FIG. 15, the transmission apparatus 1500 includes a resource determining unit 1401 and a signal transmitting unit 1402, as described above.

As shown in FIG. 15, the transmission apparatus 1500 may further include:

a resource receiving unit 1501 configured to receive information on the resource pools transmitted by a base station.

In an implementation, the information on the resource pools received by the resource receiving unit 1501 may include information on multiple types of resource pools, each type of resource pools including one or more resource pools; and the resource determining unit 1401 is further configured to determine a type of corresponding resource pools according to the sidelink discovery signal, and determine the one or more transmission resources from a corresponding type of resource pools.

In an implementation, the information on the resource pools received by the resource receiving unit 1501 may include information on a certain type of resource pools, the certain type of resource pools including one or more resource pools. And the resource determining unit 1401 is further configured to determine the one or more transmission resources from the certain type of resource pools according to the sidelink discovery signal.

Figure 16:
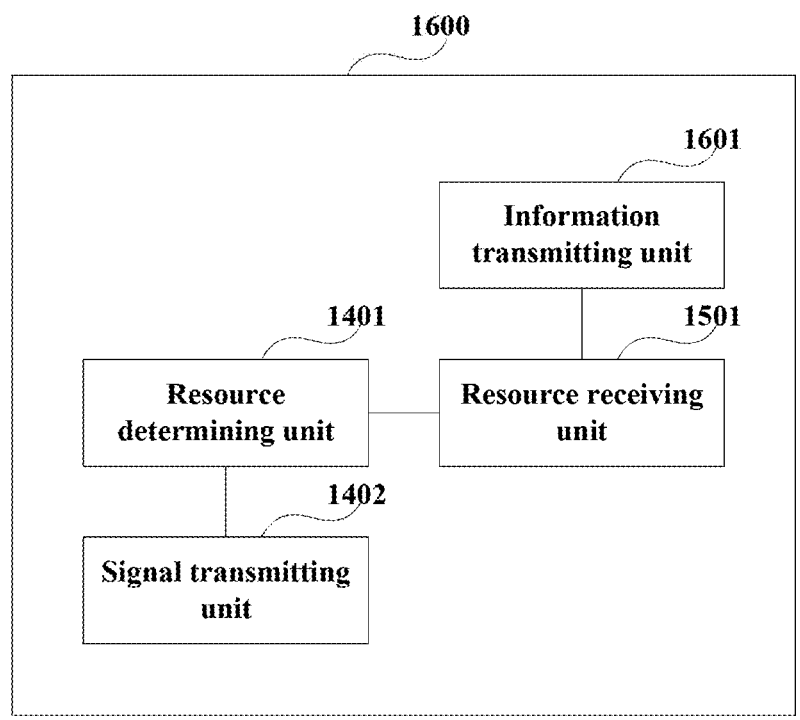
FIG. 16 is a further schematic diagram of the transmission apparatus of a discovery signal of Embodiment 3 of this disclosure.

FIG. 16 is a further schematic diagram of the transmission apparatus of a discovery signal of the embodiment of this disclosure. As shown in FIG. 16, the transmission apparatus 1600 includes a resource determining unit 1401, a signal transmitting unit 1402 and a resource receiving unit 1501, as described above.

As shown in FIG. 16, the transmission apparatus 1600 may further include:

an information transmitting unit 1601 configured to transmit information on the sidelink discovery signal to the base station, so that the base station determines a type of resource pools configured for the UE according to the information.

The embodiment of this disclosure further provides a UE, configured with the above transmission apparatus 1400, or 1500, or 1600, of a discovery signal.

Figure 17:
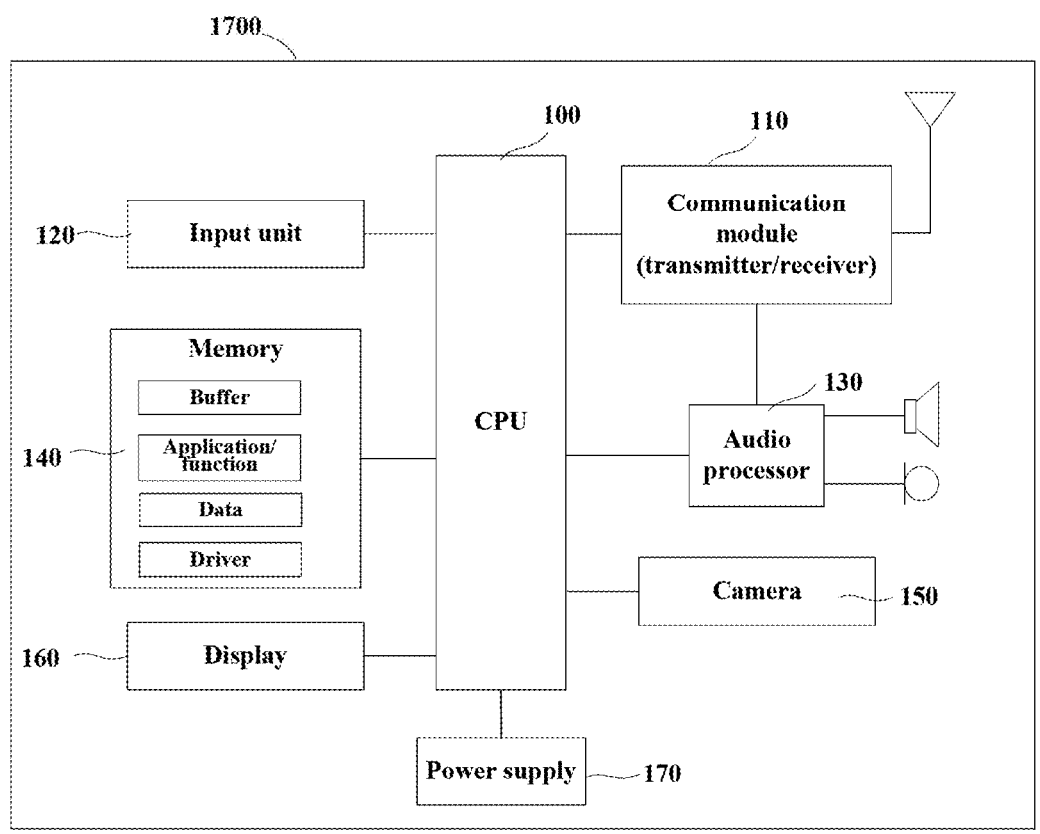
FIG. 17 is a schematic diagram of the UE of Embodiment 3 of this disclosure.

FIG. 17 is a schematic diagram of the UE of the embodiment of this disclosure. As shown in FIG. 17, the UE 1700 may include a central processing unit (CPU) 100 and a memory 140, the memory 140 being coupled to the central processing unit 100. It should be noted that this figure is illustrative only, and other types of structures may also be used, so as to supplement or replace this structure and achieve a telecommunications function or other functions.

In an implementation, the functions of the transmission apparatus 1400, or 1500, or 1600, of a discovery signal may be integrated into the central processing unit 100. For example, the central processing unit 100 may be configured to perform following control: determining one or more transmission resources from resource pools according to a sidelink discovery signal needing to be transmitted; and transmitting the sidelink discovery signal by using the one or more transmission resources; the resource pools are segmented in a frequency domain and/or a time domain and hence include multiple types.

In another implementation, the transmission apparatus 1400, or 1500, or 1600, of a discovery signal and the central processing unit 100 may be configured separately. For example, the transmission apparatus 1400, or 1500, or 1600, of a discovery signal may be configured as a chip connected to the central processing unit 100, with its functions being realized under control of the central processing unit 100.

As shown in FIG. 17, the UE 1700 may further include a communication module 110, an input unit 120, an audio processor 130, a memory 140, a camera 150, a display 160 and a power supply 170. Functions of the above components are similar to those in the relevant art, and shall not be described herein any further. It should be noted that the UE 1700 does not necessarily include all the parts shown in FIG. 17, and furthermore, the UE 1700 may include parts not shown in FIG. 17, and the relevant art may be referred to.

It can be seen from the above embodiment that the UE determines one or more transmission resources from resource pools segmented in a frequency domain and/or a time domain, and transmits a sidelink discovery signal by using the one or more transmission resources. Hence, cases of waste of resources or of impossible carrying may be reduced as much as possible even if sizes of discovery information are different due to different scenarios.

Embodiment 4

The embodiment of this disclosure provides a transmission apparatus of a discovery signal, configured in a base station. The embodiment of this disclosure corresponds to the transmission method in Embodiment 2, with identical contents being not going to be described herein any further.

Figure 18:
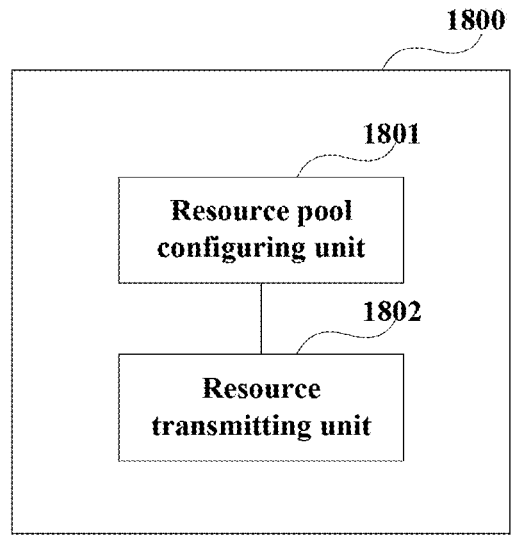
FIG. 18 is a schematic diagram of the transmission apparatus of a discovery signal of Embodiment 4 of this disclosure.

FIG. 18 is a schematic diagram of the transmission apparatus of a discovery signal of the embodiment of this disclosure. As shown in FIG. 18, the transmission apparatus 1800 includes:

a resource pool configuring unit 1801 configured to configure resource pools; the resource pools are segmented in a frequency domain and/or a time domain and hence include multiple types; and a resource transmitting unit 1802 configured to transmit information on the resource pools to a UE, so that the UE transmits a sidelink discovery signal by using one or more transmission resources determined from the resource pools.

In an implementation, the resource pools are segmented into multiple types in the frequency domain, and in the different types of resource pools, the numbers of PRBs for transmitting sidelink discovery signals are different. In each type of resource pools, the PRBs for transmitting the sidelink discovery signal are not all consecutive in the frequency domain.

In another implementation, the resource pools are segmented into multiple types in the time domain, and in the different types of resource pools, the numbers of PRBs for transmitting sidelink discovery signals are different. In each type of resource pools, the PRBs for transmitting the sidelink discovery signal are not all consecutive in the time domain.

In an implementation, the information on the resource pools includes information on multiple types of resource pools, the same types of resource pools including one or more resource pools.

In another implementation, the information on the resource pools includes information on a certain type of resource pools, the certain type of resource pools including one or more resource pools.

Figure 19:
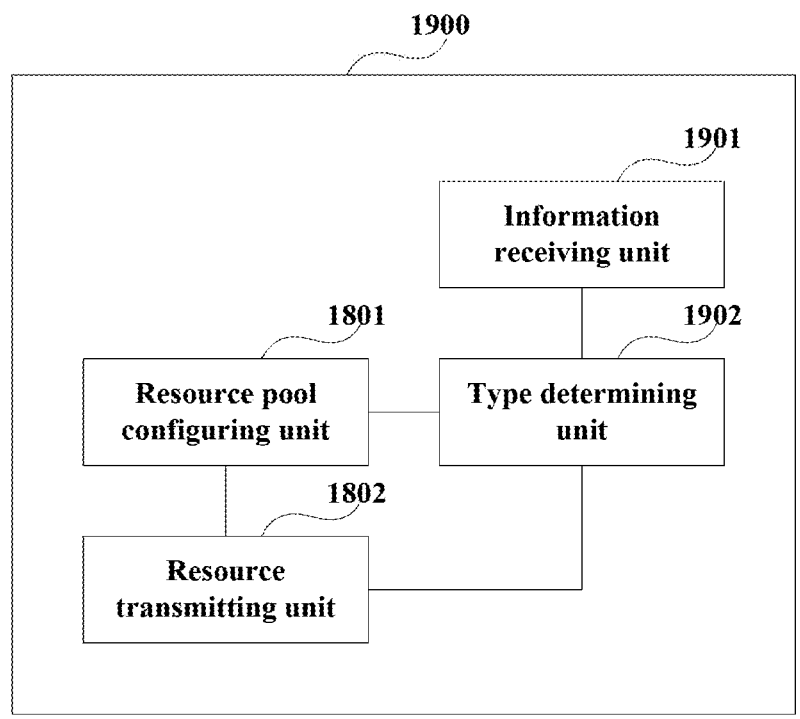
FIG. 19 is another schematic diagram of the transmission apparatus of a discovery signal of Embodiment 4 of this disclosure.

FIG. 19 is another schematic diagram of the transmission apparatus of a discovery signal of the embodiment of this disclosure. As shown in FIG. 19, the transmission apparatus 1900 includes a resource pool configuring unit 1801 and a resource transmitting unit 1802, as described above.

As shown in FIG. 19, the transmission apparatus 1900 may further include:

an information receiving unit 1901 configured to receive information on the sidelink discovery signal transmitted by the UE; and a type determining unit 1902 configured to determine a type of resource pools configured for the UE according to the information.

The embodiment of this disclosure further provides a base station, configured with the above transmission apparatus 1800 or 1900 of a discovery signal.

Figure 20:
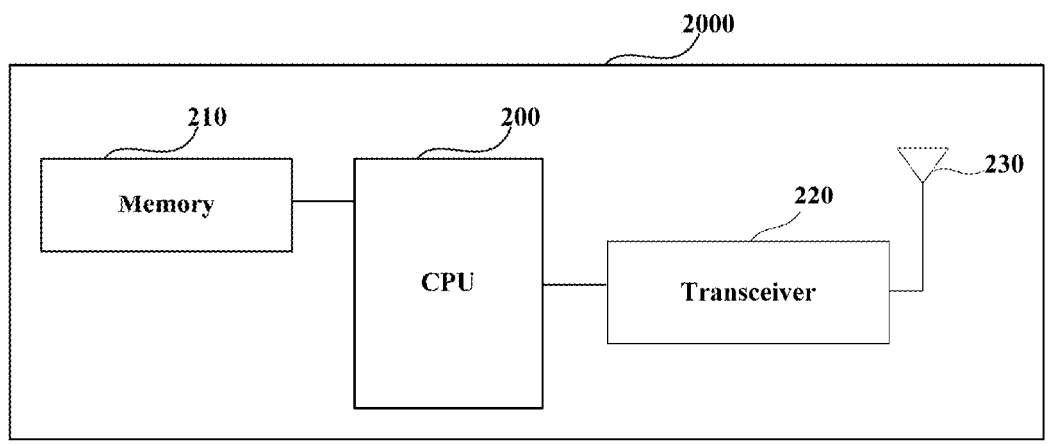
FIG. 20 is a schematic diagram of the base station of Embodiment 4 of this disclosure.

FIG. 20 is a schematic diagram of the base station of the embodiment of this disclosure. As shown in FIG. 20, the base station 2000 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The base station 2000 may carry out the transmission method of a discovery signal described in Embodiment 1. And the central processing unit 200 may be configured to carry out the functions of the transmission apparatus 1800 or 1900 of a discovery signal, that is, the central processing unit 200 may be configured to perform the following control: configuring resource pools; the resource pools are segmented in a frequency domain and/or a time domain and hence include multiple types; and transmitting information on the resource pools to a UE, so that the UE transmits a sidelink discovery signal by using one or more transmission resources determined from the resource pools.

Furthermore, as shown in FIG. 20, the base station 2000 may include a transceiver 220, and an antenna 230, etc. Functions of the above components are similar to those in the relevant art, and shall not be described herein any further. It should be noted that the base station 2000 does not necessarily include all the parts shown in FIG. 20, and furthermore, the base station 2000 may include parts not shown in FIG. 20, and the relevant art may be referred to.

It can be seen from the above embodiment that the UE determines one or more transmission resources from resource pools segmented in a frequency domain and/or a time domain, and transmits a sidelink discovery signal by using the one or more transmission resources. Hence, cases of waste of resources or of impossible carrying may be reduced as much as possible even if sizes of discovery information are different due to different scenarios.

Embodiment 5

Figure 21:
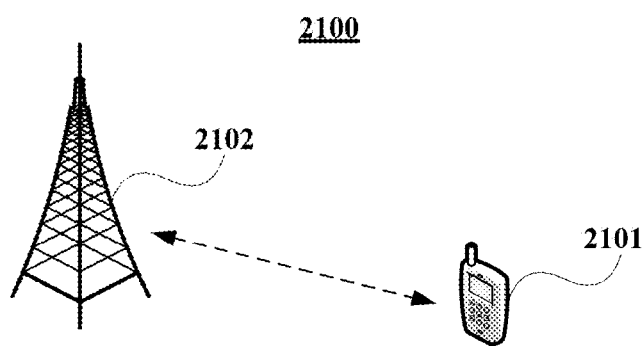
FIG. 21 is a schematic diagram of the communication system of Embodiment 5 of this disclosure.

The embodiment of this disclosure provides a communication system, with contents identical to those in embodiments 1-4 being not going to be described herein any further. FIG. 21 is a schematic diagram of the communication system of the embodiment of this disclosure. As shown in FIG. 21, the communication system 2100 includes a UE 2101.

The UE 2101 is configured to determine one or more transmission resources from resource pools according to a sidelink discovery signal needing to be transmitted, and transmit the sidelink discovery signal by using the one or more transmission resources; the resource pools are segmented in a frequency domain and/or a time domain and hence include multiple types.

As shown in FIG. 21, the communication system 2100 may further include:

a base station 2102 configured to configure the resource pools, and transmit information on multiple types of or a certain type of resource pools to the UE.

The resource pools are segmented into multiple types in a frequency domain and/or a time domain, and in different types of resource pools, the numbers of physical resource blocks for transmitting sidelink discovery signals are different.

An embodiment of the present disclosure provides a computer readable program code, which, when executed in a UE, will cause a computer unit to carry out the transmission method of a discovery signal described in Embodiment 1 in the UE.

An embodiment of the present disclosure provides a computer readable medium, including a computer readable program code, which will cause a computer unit to carry out the transmission method of a discovery signal described in Embodiment 1 in a UE.

An embodiment of the present disclosure provides a computer readable program code, which, when executed in a base station, will cause a computer unit to carry out the transmission method of a discovery signal described in Embodiment 2 in the base station.

An embodiment of the present disclosure provides a computer readable medium, including a computer readable program code, which will cause a computer unit to carry out the transmission method of a discovery signal described in Embodiment 2 in a base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A transmission apparatus of a discovery signal, configured in a user equipment, the transmission apparatus comprising:
    a processor configured to determine a type of discovery message according to whether the discovery message relates to public safety service or non-public safety service, and determine a corresponding number of pieces of the discovery message, and the discovery message is to be transmitted by the user equipment to other user equipment(s); and
    an information transmitter configured to transmit information on a sidelink discovery signal to a base station to request resource for sidelink discovery,
    wherein the information transmitted to the base station to request resource for sidelink discovery comprises first information and second information, the first information is information of the type of the discovery message according to whether the discovery message relates to public safety service or non-public safety service, the second information is information of the corresponding number of pieces of the discovery message.

2. The transmission apparatus according to claim 1, further comprising:
    resource determining processor circuitry configured to determine one or more transmission resources from resource pools according to a sidelink discovery signal needing to be transmitted; wherein the resource pools are segmented in a frequency domain and/or a time domain and comprise multiple types; and
    a signal transmitter configured to transmit the sidelink discovery signal by using the one or more transmission resources.

3. The transmission apparatus according to claim 2, wherein in each type of resource pools, physical resource blocks for transmitting the one or more sidelink discovery signals are not all consecutive in the frequency domain.

4. The transmission apparatus according to claim 2, wherein in each type of resource pools, physical resource blocks for transmitting the one or more sidelink discovery signals are not all consecutive in the time domain.

5. The transmission apparatus according to claim 2, wherein the transmission apparatus further comprises:
    a resource receiver configured to receive information on the resource pools transmitted by a base station.

6. The transmission apparatus according to claim 5, wherein the information on the resource pools received by the resource receiver comprises information on multiple types of resource pools, each type of resource pools comprising one or more resource pools;
    and the resource determining processor circuitry is further configured to determine a type of corresponding resource pools according to the sidelink discovery signal, and determine the one or more transmission resources from a corresponding type of resource pools.

7. The transmission apparatus according to claim 5, wherein the information on the resource pools received by the resource receiver comprises information on a certain type of resource pools, the certain type of resource pools comprising one or more resource pools;
    and the resource determining processor circuitry is further configured to determine the one or more transmission resources from the certain type of resource pools according to the sidelink discovery signal.

8. The transmission apparatus according to claim 2, wherein the resource pools are segmented into multiple types with different resource allocation granularities for discovery signals in the frequency domain and/or the time domain, and in different types of resource pools, the numbers of physical resource blocks for transmitting one or more sidelink discovery signals are different.

9. A transmission apparatus of a discovery signal, configured in a base station, the transmission apparatus comprising:
    an information receiver configured to receive information on a sidelink discovery signal transmitted by a user equipment requesting resource for sidelink discovery, the information transmitted to the base station to request resource for sidelink discovery comprises first information and second information, the first information is information of a type of discovery message, the second information is information of the corresponding number of pieces of the discovery message, wherein the type of discovery message is determined according to whether the discovery message relates to public safety service or non-public safety service, and the discovery message is to be transmitted by the user equipment to other user equipment(s); and
    type determining processor circuitry configured to determine a type of resource pools configured for the user equipment according to the received information.

10. The transmission apparatus according to claim 9, further comprising:
    resource pool configuring processor circuitry configured to configure resource pools; wherein the resource pools are segmented in a frequency domain and/or a time domain and hence comprise multiple types; and
    a resource transmitter configured to transmit information on the resource pools to a user equipment, so that the user equipment transmits a sidelink discovery signal by using one or more transmission resources determined from the resource pools.

11. The transmission apparatus according to claim 10, wherein in each type of resource pools, physical resource blocks for transmitting the one or more sidelink discovery signals are not all consecutive in the frequency domain.

12. The transmission apparatus according to claim 10, wherein in each type of resource pools, physical resource blocks for transmitting the one or more sidelink discovery signals are not all consecutive in the time domain.

13. The transmission apparatus according to claim 10, wherein the information on the resource pools comprises information on multiple types of resource pools, the same types of resource pools comprising one or more resource pools.

14. The transmission apparatus according to claim 10, wherein the information on the resource pools comprises information on a certain type of resource pools, the certain type of resource pools comprising one or more resource pools.

15. The transmission apparatus according to claim 10, wherein the resource pools are segmented into multiple types with different resource allocation granularities for discovery signals in the frequency domain and/or the time domain, and in different types of resource pools, the numbers of physical resource blocks for transmitting one or more sidelink discovery signals are different.

16. A communication system, comprising:
a base station; and
a user equipment configured to determine a type of discovery message according to whether the discovery message relates to public safety service or non-public safety service, and determine a corresponding number of pieces of the discovery message; and transmit information on a sidelink discovery signal to the base station to request resource for sidelink discovery, wherein the information transmitted to the base station to request resource for sidelink discovery comprises first information and second information, the first information is information of the type of the discovery message according to whether the discovery message relates to public safety service or non-public safety service, the second information is information of the corresponding number of pieces of the discovery message, and the discovery message is to be transmitted by the user equipment to other user equipment(s).

17. The communication system according to claim 16, wherein the base station is further configured to receive the information on a sidelink discovery signal transmitted by the user equipment; and determine a type of resource pools configured for the user equipment according to the received information.

18. The communication system according to claim 16, wherein the user equipment is further configured to determine one or more transmission resources from resource pools according to a sidelink discovery signal needing to be transmitted, and transmit the sidelink discovery signal by using the one or more transmission resources, wherein the resource pools are segmented in a frequency domain and/or a time domain and comprise multiple types, and
wherein the resource pools are segmented into multiple types with different resource allocation granularities for discovery signals in the frequency domain and/or the time domain, and in different types of resource pools, the numbers of physical resource blocks for transmitting one or more sidelink discovery signals are different.

19. The communication system according to claim 18, wherein the base station is further configured to configure the resource pools, and transmit information on multiple types of or a certain type of resource pools to the user equipment.

* * * * *